United States Patent [19]

Cesark

[11] Patent Number: 4,992,011
[45] Date of Patent: Feb. 12, 1991

[54] CUTTING AND SHAPING TOOL

[75] Inventor: Robert J. Cesark, Putnam Valley, N.Y.

[73] Assignee: Fred M. Velepec Co., Inc., Glendale, N.Y.

[21] Appl. No.: 334,217

[22] Filed: Apr. 6, 1989

[51] Int. Cl.$^5$ .............................................. B27C 5/00
[52] U.S. Cl. .................................... 409/126; 407/120; 144/145 C
[58] Field of Search ................................. 409/125–129, 409/124, 110, 97; 407/120; 144/144 R, 144.5 R, 144.5 GT, 145 C; 51/102, 208; 384/58; 354/903, 585, 537

[56] References Cited

U.S. PATENT DOCUMENTS

| | | | |
|---|---|---|---|
| 706,488 | 8/1902 | Crapp | 144/145 C |
| 947,079 | 1/1910 | Latcham | 144/145 C |
| 1,368,403 | 2/1921 | Knourek | 144/145 C |
| 1,615,893 | 2/1927 | Wagner | 144/145 X |
| 1,715,380 | 6/1929 | Onsrud | 144/144 R |
| 2,198,376 | 4/1940 | Cederberg | 384/903 X |
| 2,607,989 | 8/1952 | Peterson et al. | 409/126 X |
| 3,504,952 | 4/1970 | Farmer | 384/58 X |
| 4,168,730 | 9/1979 | Keller | 144/144.5 R X |
| 4,541,760 | 9/1985 | Zoueki | 409/137 |
| 4,733,997 | 3/1988 | Ford et al. | 409/110 X |

FOREIGN PATENT DOCUMENTS

| | | | |
|---|---|---|---|
| 667422 | 11/1938 | Fed. Rep. of Germany | 384/585 |
| 1201809 | 8/1970 | Fed. Rep. of Germany | 384/585 |
| 617186 | of 1961 | Italy | 144/144 R |

OTHER PUBLICATIONS

American Machinist, pp. 139 & 140, 2/28/46.

*Primary Examiner*—Z. R. Bilinsky
*Assistant Examiner*—R. Schultz
*Attorney, Agent, or Firm*—Kenyon & Kenyon

[57] ABSTRACT

A carbide tipped cutting tool adapted to shape the edge surface of a counter top which opens about a sink or bowl mounted therebeneath. The cutting tool is provided with a nylon follower adapted to engage the side wall of the sink or bowl to facilitate cutting and shaping of the edge portion of the counter top. The nylon follower is mounted on a bearing member with a second bearing member mounted beneath the nylon follower to prevent inadvertent dislodging from the shaft of the cutting tool.

4 Claims, 1 Drawing Sheet

CUTTING AND SHAPING TOOL

BACKGROUND OF THE INVENTION

This invention relates to cutting tools generally and, in particular, to one suitable for shaping the edge surface of a counter top. The cutting tool of this invention is also useful for shaping the opening in a counter top having a sink or bowl mounted therebeneath.

Counter tops having a bowl or sink member mounted therebeneath are frequently formed as a single unit with the edge portion of the opening in the counter top having been molded or shaped at the factory. Numerous installations, however, require customized sizing and therefore need the top portion to be cut and shaped at the installation site. In these instances, it is necessary to form a rough opening shape and do the final cutting and shaping after the sink or bowl member has been mounted to the bottom side of the counter top. In addition, it is frequently necessary to cut and shape the outer edge of a counter top used for other purposes.

Cutting and shaping tools suitable for on-site edging of counter tops, such as those fabricated of Corian, is accomplished with cutting tools which typically have a carbide tip cutting edge shaped to conform to the desired contour to be imparted on the counter top. In order to guide the shaping, the tool includes a nylon follower which has its outer diameter shaped to match the side wall of the bowl or sink. Depending upon the slope of the surface with which the follower is to be engaged, there are instances in which the follower is generally straight or only slightly tapered. In any event, during the continuous cutting of such materials as Corian, it has been found that on occasion the nylon follower becomes dislodged from the cutting tool, because of heating of the various parts of the cutting tool member. By the means disclosed herein, a cutting and shaping tool is provided which overcomes this drawback and retains the tool in operative form for cutting a large number of installations.

SUMMARY OF THE INVENTION

In the preferred embodiment, a cutting tool suitable for shaping the top counter section mounted to a fixture member therebeneath is provided with a nylon follower which retains its position during cutting and shaping of a number of installations. The cutting tool includes a shaft member with a shaped cutting edge to implement the desired shape to the edge of the counter. The lower end of the cutting tool has mounted thereon a first bearing disposed adjacent the cutting means. A follower means is mounted on the first bearing and has its outer diameter substantially contoured to the shape of the fixture side wall so that it remains in engagement therewith during the cutting and shaping of the open edge of the counter section. A capping means is disposed adjacent the follower and has a portion thereof mounted to the follower. A second bearing is disposed adjacent the capping means and has a diameter larger than the inside diameter of the follower means. In this manner, the follower means is prevented from becoming dislodged from the shaft member during operation. A fastener, such as a screw member, is used for securing the first bearing means, capping means, follower means and second bearing means to the shaft member.

The cutting tool is preferably provided with a follower means in the form of a nylon circular follower which has a tapered outer diameter contoured to the shape of the inside section of the sink or bowl member. Other shapes or materials may of course be used, including straight shapes and materials such as Delrin. The inner diameter of the nylon circular follower includes a portion adapted to be mounted to the first bearing means and a second portion of a diameter adapted to be mounted to the capping means.

It is also preferred to provide the cutting tool with a circular capping member having an outer diameter with one portion adapted to be fitted inside the nylon follower and a second portion adapted to be mounted to the second bearing means.

Accordingly, it is an object of this invention to provide a cutting tool suitable for shaping counter tops wherein the follower means is mounted to the cutting tool to allow cutting and shaping of a series of installations.

It is another object of this invention to provide a cutting tool having a nylon follower which is adapted to be retained on the cutting tool during a series of installations without any inadvertent dislodgment of the follower.

These and other objects of the invention shall become more apparent from the following description of the invention, taken in conjunction with the drawings.

DESCRIPTION OF THE PREFERRED EMBODIMENT

Figure 1:
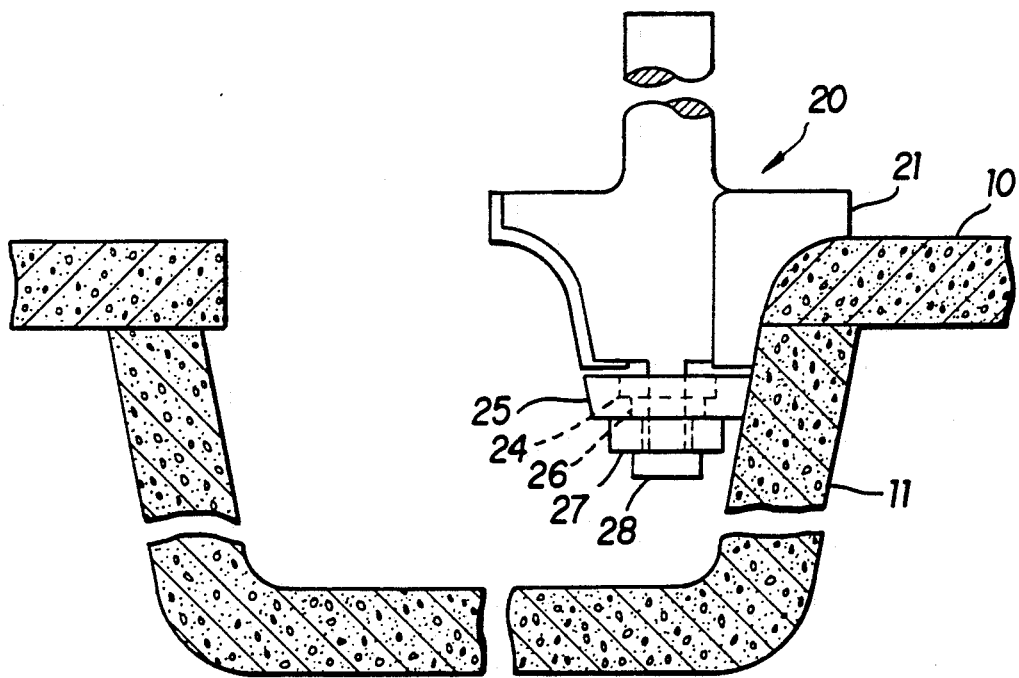
FIG. 1 is an elevation view of the cutting tool of this invention depicted shaping the cut out edge of a counter top.
Figure 2:
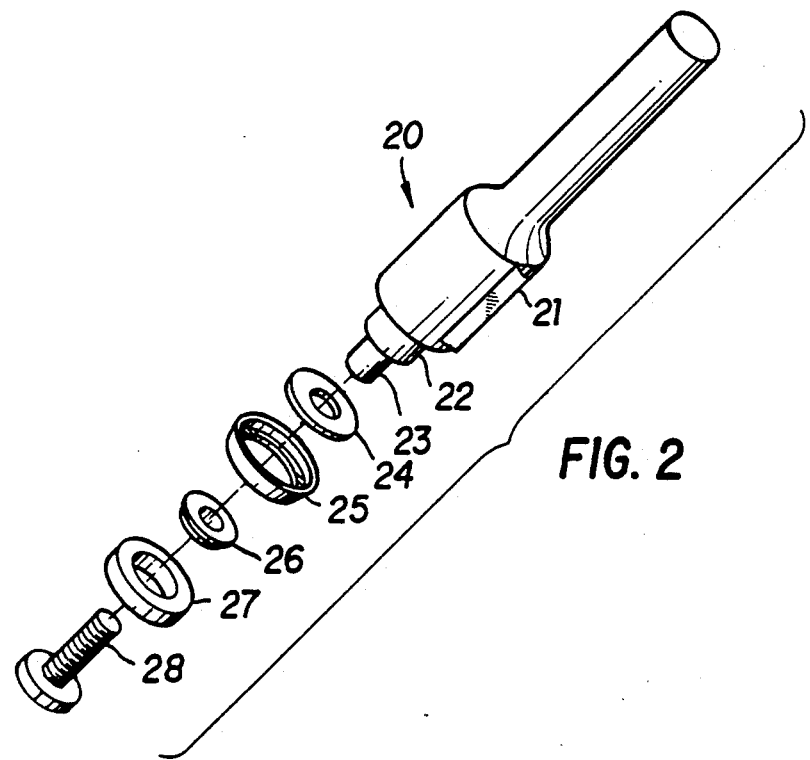
FIG. 2 is an exploded perspective view of the cutting tool of this invention depicted with a straight edge blade.

With reference to the drawings and in particular, FIG. 1, the cutting tool 20 is depicted having a shaped carbide tip cutting edge 21. In FIG. 2, the carbide tip cutting edge is straight. The cutting edge 21 is shaped to provide the desired contour to the inside open section of the counter top 10. Of course, cutting tool 20 may be used in cutting and shaping the outer edge of counter top 10. Cutting tool 20 includes a nylon follower 25 which is tapered on its outside diameter. In order to provide the desired shape to the cut out section, the nylon follower 25 of cutting tool 20 is placed into engagement with the side wall section of the sink or bowl member 11. In this manner, cutting of the counter top 10 progresses along the periphery of the cut out section until the desired shape is achieved with nylon follower 25 guiding the cutting because of its engagement with the side wall of sink or bowl 11. In those instances where cutting tool 20 is used to shape the outer edge of a counter top, nylon follower 25 may be provided with a straight shape and engage a straight wall of a fixture disposed below the counter top.

Cutting tool 20 includes a shaft section 22 protruding beneath the carbide tipped cutting edge 21. A smaller diameter shaft section 23 extends from shaft portion 22 and includes a receptacle for receiving a screw type fastener. A bearing member 24 is mounted to shaft section 22 and in turn has a nylon follower 25 mounted thereon. Thus, bearing 24 and nylon follower 25 mounted thereon rotate about shaft section 22.

Nylon follower 25 includes an inner diameter sized to mate with bearing member 24 and a second inner diameter of a smaller size. The smaller inner diameter is adapted to mount with the larger diameter of a circular cap member 26 having an outer diameter with one portion adapted to be fitted inside the nylon follower and a second portion adapted to be mounted to the second bearing means. The smaller diameter of cap member 26 is adapted to mount bearing 27. Bearing 27 is sized to have an outer diameter larger than that of the inner diameter of nylon follower 25. In this manner, bearing member 27 prevents the dislodgment of the nylon follower 25 from the cutting tool 20.

The various components of the cutting tool 20 are assembled by means of a screw type fastener 28. Screw fastener 28 mounts to the threaded receptacle in the shaft portion 23 of tool 20. Thus, fastener 28 holds in place bearing 24, nylon follower 25, cap 26 and bearing 27. The cutting tool of this invention has been found to retain nylon follower 25 in the appropriate position while cutting and shaping a series of installations. The follower is maintained in position despite heating of the cutting tool such as is caused working with materials such as Corian.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A cutting tool suitable for shaping the top of a counter section having a fixture disposed therebeneath the cutting tool comprising a shaft member having a shaped cutting means disposed at the lower end thereof for shaping the counter section, first bearing means mounted to said shaft member adjacent said cutting means, a follower means having at least one inside diameter and at least one outside diameter mounted on said first bearing means, substantially shaped to bear against the side wall of the fixture, capping means for capping the bearing, the capping means being disposed adjacent said follower means and having a portion thereof mounted to same follower means, a second bearing means having an inner diameter disposed adjacent same capping means and having an outer diameter larger than the inside diameter of said follower means such that the outer portion of the second bearing means abuts the follower so as to prevent the latter from becoming dislodged from said shaft member, and fastening means for securing said first bearing means, said capping means, said follower means and said second bearing means to said shaft member.

2. A cutting tool in accordance with claim 1 wherein said follower means has an axis of symmetry and comprises a nylon member having a circular cross section and a surface at the outer diameter which tapers along the axis of symmetry and said at least one inside diameter comprises one portion of a size adapted to be mounted to said first bearing means and a second portion of a size adapted to be mounted to said capping means.

3. A cutting tool in accordance with claim 2 wherein said capping means comprises a circular member having an outer diameter with one portion adapted to be mounted into said second portion of the inner diameter of said nylon follower and another portion smaller than said one portion adapted to be mounted to said second bearing means.

4. A cutting tool suitable for shaping the top of a counter section mounted to a bowl member disposed therebeneath the cutting tool comprising a shaft member having a shaped carbide tipped cutting means disposed at the lower end thereof for shaping an edge portion of the counter section, first bearing means mounted to said shaft member adjacent said carbide tipped cutting means, a nylon follower having an outer and inner diameter, the inner diameter being mounted on said first bearing means, the outer diameter being substantially contoured to the shape of the bowl side walls, capping means disposed adjacent said nylon follower and having a portion thereof mounted to said nylon follower, a second bearing means having an outer diameter and being disposed adjacent said capping means and having said outer diameter larger than the inside diameter of said nylon follower so as to contact the follower to prevent the latter from becoming dislodged from said shaft member upon heating, and fastening means for securing said first bearing means, said capping means, said nylon follower and said second bearing means to said shaft member.

* * * * *